United States Patent
Kim et al.

(10) Patent No.: US 10,739,931 B2
(45) Date of Patent: Aug. 11, 2020

(54) TOUCH SENSOR INCLUDING SENSING LINES WITH DIFFERENT WIDTHS

(71) Applicant: Samsung Display Co., Ltd., Yongin-si (KR)

(72) Inventors: Sun Kwang Kim, Yongin-si (KR); Ki Nyeng Kang, Yongin-si (KR); An Su Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/205,582

(22) Filed: Nov. 30, 2018

(65) Prior Publication Data

US 2019/0294278 A1 Sep. 26, 2019

(30) Foreign Application Priority Data

Mar. 21, 2018 (KR) .................. 10-2018-0032800

(51) Int. Cl.
*G06F 3/047* (2006.01)
*G06F 1/16* (2006.01)
*G06F 3/041* (2006.01)

(52) U.S. Cl.
CPC ............ *G06F 3/047* (2013.01); *G06F 1/1643* (2013.01); *G06F 3/0412* (2013.01)

(58) Field of Classification Search
CPC ...................................................... G06F 3/047
USPC ......................................................... 345/173
See application file for complete search history.

(56) References Cited

U.S. PATENT DOCUMENTS

| 8,922,505 | B2 | 12/2014 | Kang et al. |
| 9,095,017 | B2 | 7/2015 | Yi et al. |
| 9,214,646 | B2 | 12/2015 | Bae et al. |
| 9,927,939 | B2 | 3/2018 | Na et al. |
| 2015/0185903 | A1* | 7/2015 | Park ................. G06F 3/044 345/173 |
| 2018/0182822 | A1* | 6/2018 | Seo .................. G06F 3/0416 |

FOREIGN PATENT DOCUMENTS

KR  10-2016-0020987  2/2016

* cited by examiner

*Primary Examiner* — Long D Pham
(74) *Attorney, Agent, or Firm* — H.C. Park & Associates, PLC

(57) ABSTRACT

A touch sensor includes a substrate, sensing electrodes (SEs), and sensing lines (SLs). The substrate includes a sensing area (SA) and a peripheral area outside the SA. The SEs overlap the SA. The SLs overlap the peripheral area, are respectively connected to the SEs, and include first SLs (FSLs) alternatingly arranged with second SLs (SSLs). Each of the SLs includes: a first metal layer (FML) on the substrate; a first insulating layer (FIL) on the FML and including a first contact hole (FCH) exposing the FML; and a second metal layer (SML) on the FIL and connected to the FML through the FCH. A width of the FML of each of the FSLs is different from a width of the FML of each of the SSLs. A width of the SML of each of the FSLs is different from a width of the SML of each of the SSLs.

20 Claims, 10 Drawing Sheets

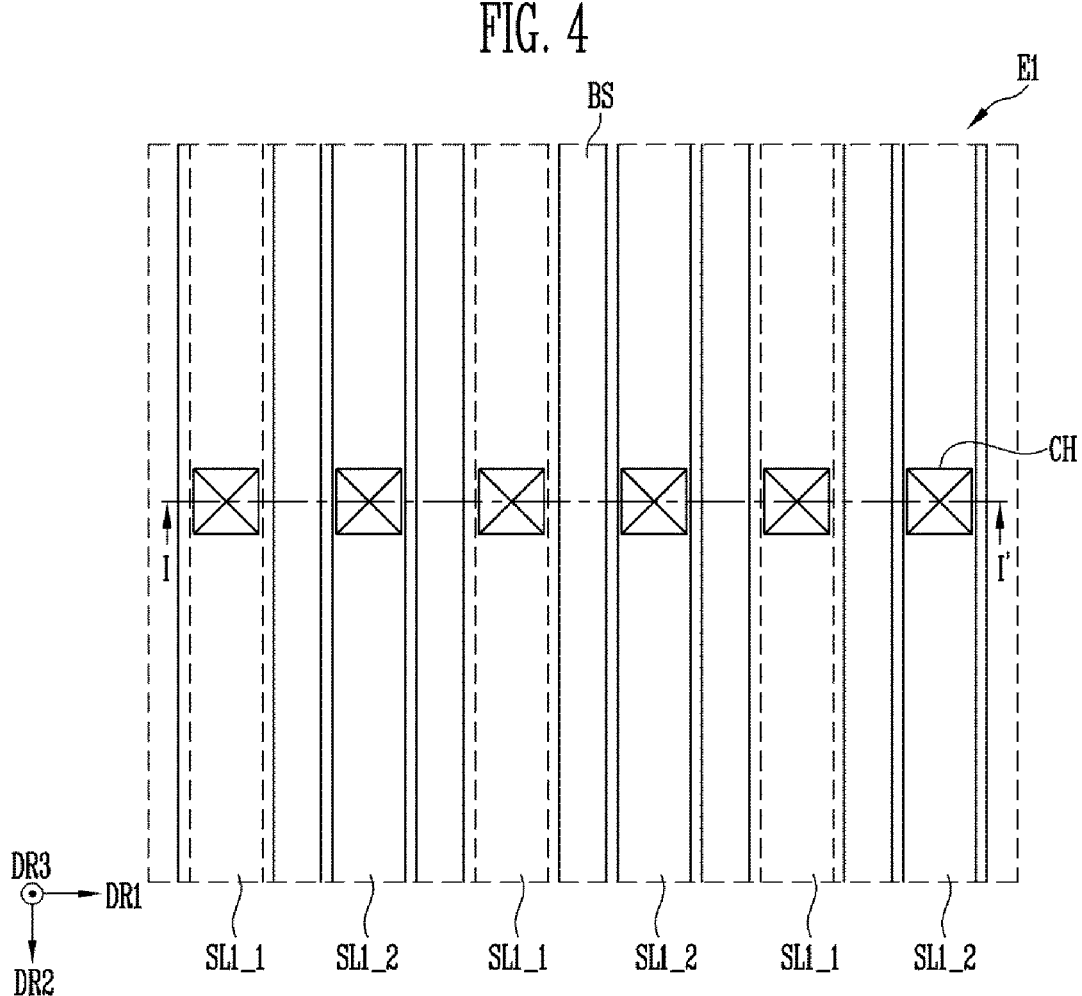
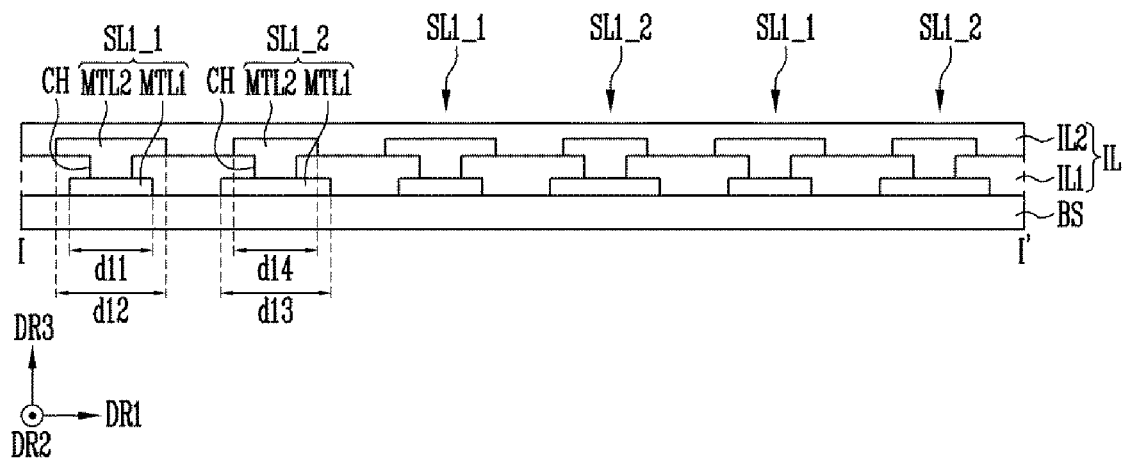

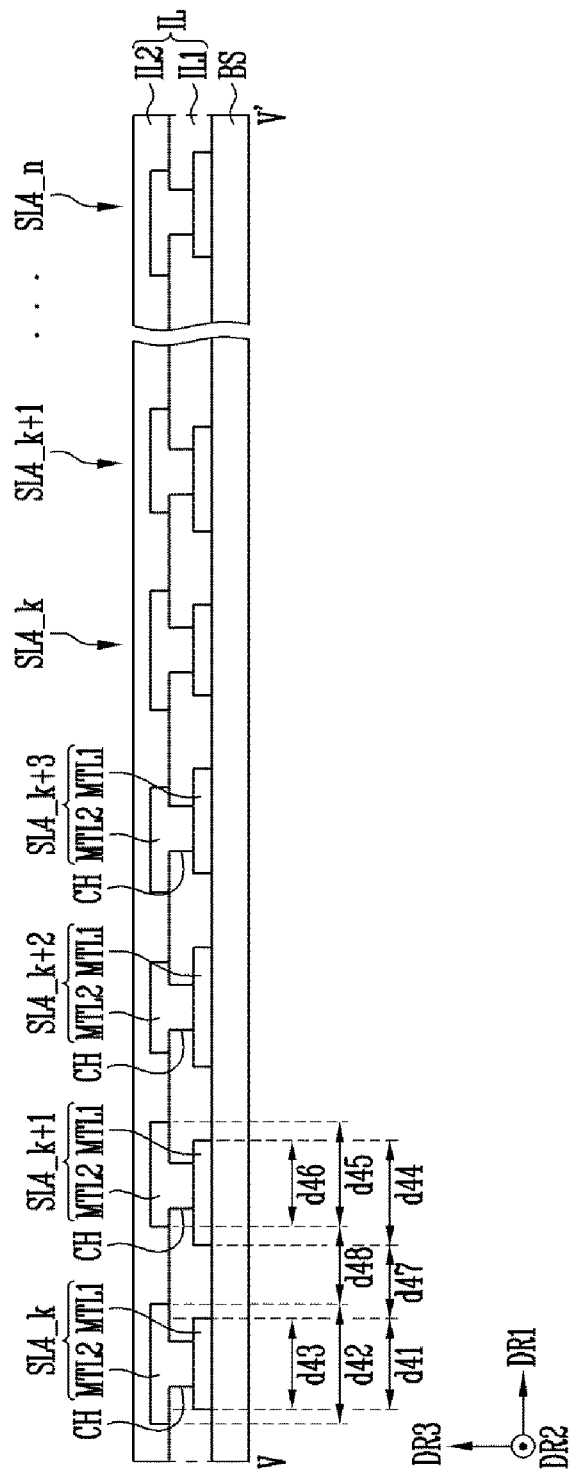

TOUCH SENSOR INCLUDING SENSING LINES WITH DIFFERENT WIDTHS

CROSS-REFERENCE TO RELATED APPLICATION

This application claims priority from and the benefit of Korean Patent Application No. 10-2018-0032800, filed Mar. 21, 2018, which is hereby incorporated by reference for all purposes as if fully set forth herein.

BACKGROUND

Field

Exemplary embodiments generally relate to a touch sensing, and more particularly, to a touch sensor.

Discussion

A touch sensor is an input device that enables a user to, for instance, select instruction content displayed on a screen of a display device or the like with a human hand or an object, e.g., stylus, etc., and to input one or more user instructions. A touch sensor typically includes sensing electrodes, sensing lines connected to the sensing electrodes, and a pad portion connected to the sensing lines. Accordingly, the touch sensor is able to recognize a touch event occurring in a sensing area as an input signal. To reduce line resistance of the sensing lines, each of "n" sensing lines (where " "n" is a natural number greater than zero) may be configured to have a double-layer structure such that a lower metal layer and an upper metal layer are connected to each other through contact holes. It is noted, however, that as display devices having such touch sensors trend toward a reduction in the size of a non-display area, space for the sensing lines disposed in the non-display area may be reduced.

The above information disclosed in this section is only for understanding the background of the inventive concepts, and, therefore, may contain information that does not form prior art.

SUMMARY

Some exemplary embodiments provide a touch sensor capable of preventing (or at least reducing the potential of) a short circuit between sensing lines.

Additional aspects will be set forth in the detailed description which follows, and, in part, will be apparent from the disclosure, or may be learned by practice of the inventive concepts.

According to some exemplary embodiments, a touch sensor includes a substrate, sensing electrodes, and sensing lines. The substrate includes a sensing area, and a peripheral area outside the sensing area. The sensing electrodes overlap the sensing area. The sensing lines overlap the peripheral area and are respectively connected to the sensing electrodes. The sensing lines include first sensing lines alternatingly arranged with second sensing lines. Each of the first sensing lines and the second sensing lines includes: a first metal layer on the substrate; a first insulating layer on the first metal layer, the first insulating layer including a first contact hole exposing a portion of the first metal layer; and a second metal layer on the first insulating layer, the second metal layer being connected to the first metal layer through the first contact hole. A width of the first metal layer of each first sensing line of the first sensing lines is different from a width of the first metal layer of each second sensing line of the second sensing lines. A width of the second metal layer of each first sensing line of the first sensing lines is different from a width of the second metal layer of each second sensing line of the second sensing lines.

In some exemplary embodiments, the width of the first metal layer of each first sensing line of the first sensing lines may be smaller than the width of the first metal layer of each second sensing line of the second sensing lines, and the width of the second metal layer of each first sensing line of the first sensing lines may be greater than the width of the second metal layer of each second sensing line of the second sensing lines.

In some exemplary embodiments, the width of the second metal layer of each first sensing line of the first sensing lines may be equal to the width of the first metal layer of each second sensing line of the second sensing lines.

In some exemplary embodiments, a sum of the width of the second metal layer of each first sensing line of the first sensing lines and the width of the second metal layer of each second sensing line of the second sensing lines may be equal to a sum of the width of the first metal layer of each first sensing line of the first sensing lines and the width of the first metal layer of each second sensing line of the second sensing lines.

In some exemplary embodiments, the width of the first metal layer of each first sensing line of the first sensing lines may be greater than the width of the first metal layer of each second sensing line of the second sensing lines, and the width of the second metal layer of each first sensing line of the first sensing lines may be smaller than the width of the second metal layer of each second sensing line of the second sensing lines.

In some exemplary embodiments, the width of the first metal layer of each first sensing line of the first sensing lines may be equal to the width of the second metal layer of each second sensing line of the second sensing lines.

In some exemplary embodiments, a sum of the width of the second metal layer of each first sensing line of the sensing lines and the width of the second metal layer of each second sensing line of the second sensing lines may be equal to a sum of the width of the first metal layer of each first sensing line of the first sensing lines and the width of the first metal layer of each second sensing line of the second sensing lines.

In some exemplary embodiments, each of the sensing electrodes may include a plurality of first conductive lines extending along a first direction and a plurality of second conductive lines extending along a second direction crossing the first direction.

According to some exemplary embodiments, a touch sensor includes a substrate, sensing electrodes, and sensing lines. The substrate includes a sensing area, and a peripheral area outside the sensing area. The sensing electrodes overlap the sensing area. The sensing lines overlap the peripheral area and are respectively connected to the sensing electrodes. The sensing lines include first sensing lines alternatingly arranged with second sensing lines. Each of the first sensing lines and the second sensing lines includes: a first metal layer on the substrate; a first insulating layer on the first metal layer, the first insulating layer including a first contact hole exposing a portion of the first metal layer; and a second metal layer on the first insulating layer, the second metal layer being connected to the first metal layer through the first contact hole. A width of the first metal layer of each first sensing line of the first sensing lines is equal to a width of the first metal layer of each second sensing line of the second sensing lines, and a width of the second metal layer of each first sensing line of the first sensing lines is different from a width of the second metal layer of each second sensing line of the second sensing lines; or a width of the second metal layer of each first sensing line of the first sensing lines is equal to a width of the second metal layer of each second sensing line of the second sensing lines, and a width of the first metal layer of each first sensing line of the first sensing lines is different from a width of the first metal layer of each second sensing line of the second sensing lines.

In some exemplary embodiments, a common width of the first metal layers of each first sensing line of the first sensing lines and each second sensing line of the second sensing lines may be equal to a greater value among the width of the second metal layers of each first sensing line of the first sensing lines and each second sensing line of the second sensing lines, or a common width of the second metal layers of each first sensing line of the first sensing lines and each second sensing line of the second sensing lines may be equal to a greater value among the width of the first metal layers of each first sensing line of the first sensing lines and each second sensing line of the second sensing lines.

In some exemplary embodiments, each of the sensing electrodes may include a plurality of first conductive lines extending along a first direction and a plurality of second conductive lines extending along a second direction crossing the first direction.

According to some exemplary embodiments, a touch sensor includes a substrate, sensing electrodes, and n sensing lines. The substrate includes a sensing area, and a peripheral area outside the sensing area. The sensing electrodes overlap the sensing area. The n sensing lines overlap the peripheral area and are respectively connected to the sensing electrodes, n being a natural number. Each of the n sensing lines includes: a first metal layer on the substrate; a first insulating layer on the first metal layer, the first insulating layer including a first contact hole exposing a portion of the first metal layer; and a second metal layer on the first insulating layer, the second metal layer being connected to the first metal layer through the first contact hole. The n sensing lines include iterations of 1 sensing lines as a unit, 1 being a natural number greater than or equal to two and less than or equal to n. In the unit, a width of the first metal layer of a $k^{th}$ sensing line is different from a width of the first metal layer of a $(k+1)^{th}$ sensing line adjacent to the $k^{th}$ sensing line, k being a natural number less than or equal to 1-1. In the unit, a width of the second metal layer of the $k^{th}$ sensing line is different from a width of the second metal layer of the $(k+1)^{th}$ sensing line. A distance between the first metal layer of the $k^{th}$ sensing line and the first metal layer of the $(k+1)^{th}$ sensing line is equal to a distance between the second metal layer of the $k^{th}$ sensing line and the second metal layer of the $(k+1)^{th}$ sensing line.

In some exemplary embodiments, a width of an overlapping region of the first metal layer of the $k^{th}$ sensing line and the second metal layer of the $k^{th}$ sensing line may be equal to a width of an overlapping region of the first metal layer of the $(k+_1)^{th}$ sensing line and the second metal layer of the $(k+1)^{th}$ sensing line.

In some exemplary embodiments, a sum of the width of the first metal layer of the $k^{th}$ sensing line and the width of the second metal layer of the $k^{th}$ sensing line may be equal to a sum of the width of the first metal layer of the $(k+1)^{th}$ sensing line and the width of the second metal layer of the $(k+1)^{th}$ sensing line.

In some exemplary embodiments, each of the sensing electrodes may include a plurality of first conductive lines extending along a first direction and a plurality of second conductive lines extending along a second direction crossing the first direction.

In some exemplary embodiments, the n sensing lines may be adjacent to one another in a first direction, and a layer structure of the $k^{th}$ sensing line may have mirror symmetry with a layer structure of a $(k+2)^{th}$ sensing line with respect to an imaginary line extending in the first direction, the imaginary line bisecting the $k^{th}$ sensing line and the $(k+2)^{th}$ sensing line.

In some exemplary embodiments, a layer structure of the $(k+1)^{th}$ sensing line may have mirror symmetry with a layer structure of a $(k+3)^{th}$ sensing line with respect to an imaginary line extending in a second direction perpendicular to the first direction.

In some exemplary embodiments, a width of the second metal layer of the $(k+1)^{th}$ sensing line may be equal to a width of the second metal layer of the $(k+3)^{th}$ sensing line, and a width of the second metal layer of the $(k+2)^{th}$ sensing line may be smaller than the width of the second metal layer of the $(k+1)^{th}$ sensing line.

In some exemplary embodiments, a width of the second metal layer of the $(k+1)^{th}$ sensing line may be equal to a width of the second metal layer of the $(k+3)^{th}$ sensing line, and a width of the second metal layer of the $(k+2)^{th}$ sensing line may be greater than the width of the second metal layer of the $(k+1)^{th}$ sensing line.

In some exemplary embodiments, the n sensing lines may be adjacent to one another in a first direction, and a layer structure of the $(k+1)^{th}$ sensing line may have mirror symmetry with a layer structure of a $(k+3)^{th}$ sensing line with respect to an imaginary line extending in a second direction perpendicular to the first direction.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 4 is an enlarged plan view of portion E1 of FIG. 3 according to some exemplary embodiments.

FIG. 5 is a cross-sectional view of the touch sensor of FIG. 3 taken along sectional line I-I' shown in FIG. 4 according to some exemplary embodiments.

FIG. 14 is a cross-sectional view of the touch sensor of FIG. 3 taken along sectional line VI-VI' in FIG. 13 according to some exemplary embodiments.

DETAILED DESCRIPTION OF THE ILLUSTRATED EMBODIMENTS

Figure 1:
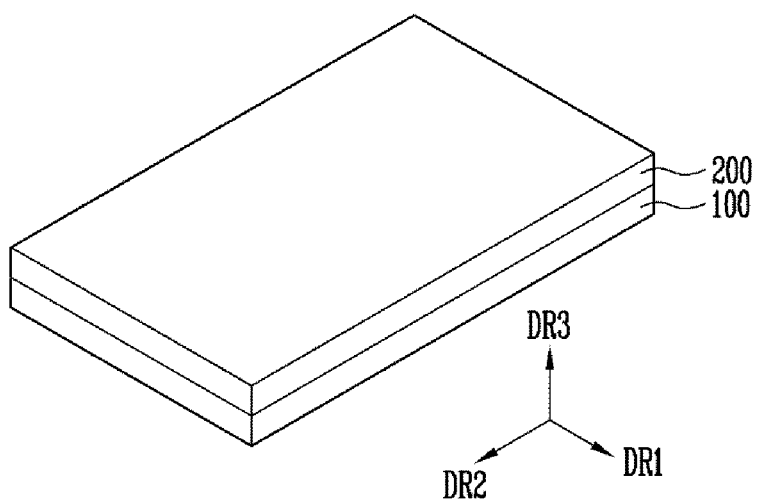
FIG. 1 is a perspective view of a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use or absence of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. Also, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be described with reference to the accompanying drawings.

Figure 2:
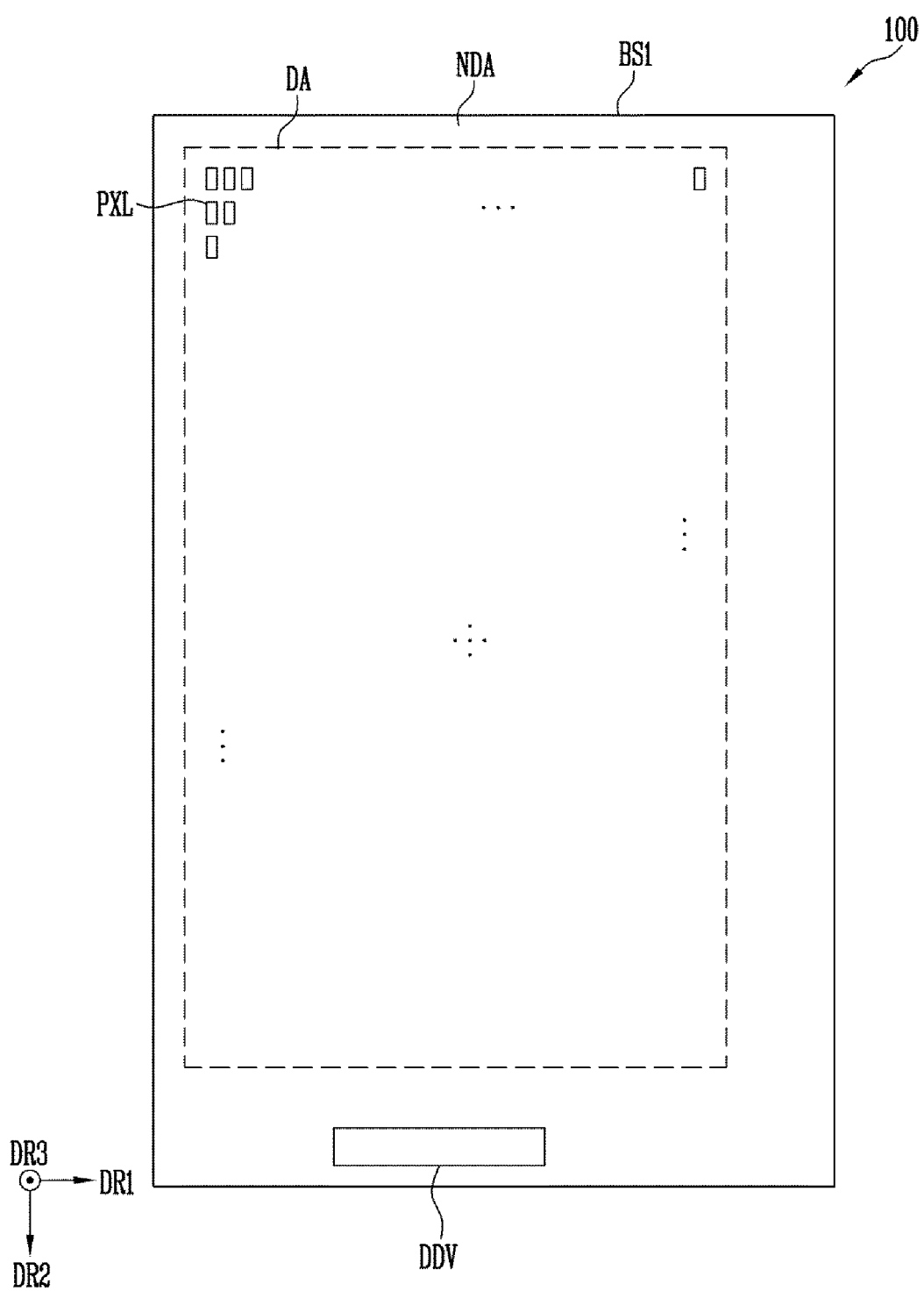
FIG. 2 is a plan view for of a display panel of the display device of FIG. 1 according to some exemplary embodiments.
Figure 3:
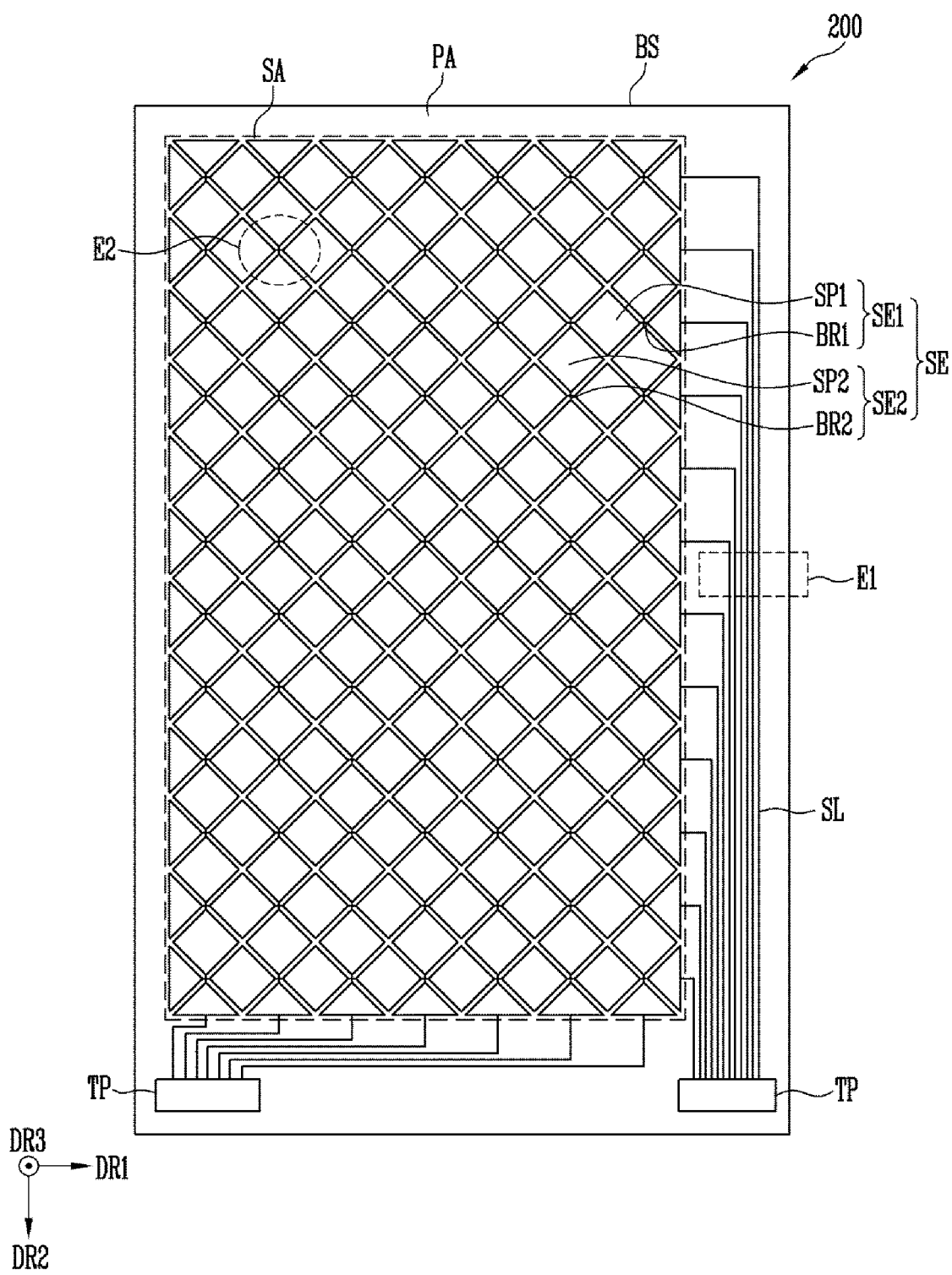
FIG. 3 is a plan view of a touch sensor of the display device of FIG. 1 according to some exemplary embodiments.

FIG. 1 is a perspective view of a display device according to some exemplary embodiments. FIG. 2 is a plan view for of a display panel of the display device of FIG. 1 according to some exemplary embodiments. FIG. 3 is a plan view of a touch sensor of the display device of FIG. 1 according to some exemplary embodiments.

Referring to FIGS. 1 to 3, the display device according to some exemplary embodiments may be provided in various forms, for example, in the form of a rectangular plate having two pairs of parallel sides. In the case where the display device is provided in the form of a rectangular plate, one of the two pairs of sides may be longer than the other. It is contemplated, however, that any suitable shape may be utilized in association with exemplary embodiments. A display device having a rectangular form with a pair of long sides and a pair of short sides is illustrated as an example in FIG. 1 for the sake of explanation. The direction in which the short sides extend refers to a first direction DR1, and the direction in which the long sides extend refers to a second direction DR2. A third direction DR3 may cross (e.g., may be perpendicular to) the first direction DR1 and the second direction DR2. The third direction DR3 may be a thickness direction of the display device.

The display device may include a display panel 100 provided with display elements (not shown) configured to display an image, and a touch sensor 200 configured to recognize a input interaction, e.g., touch, near touch, approach, hovering, etc., and/or one or more aspects of the touch interaction, e.g., location, pressure, size, etc. For convenience, a touch interaction will be described in association with a touch.

The display device may include a display area DA on (or in) which an image generated from the display panel 100 is displayed, a non-display area NDA provided on at least one side of the display area DA, a sensing area SA configured to sense a touch of a user and/or the pressure of the touch on the touch sensor 200, and a peripheral area PA provided on at least one side of the sensing area SA. The sensing area SA may overlap the display area DA. The area of the sensing area SA may be substantially equal to or greater than that of the display area DA; however, exemplary embodiments are not limited thereto.

The display panel 100 may display arbitrary visual information, e.g., text, video, photograph, and two-dimensional or three-dimensional content. Hereinafter, the arbitrary visual information will be referred to as an "image." The type of the display panel 100 is not limited so long as it can display an image.

The display panel 100 may include a substrate BS1 having the display area DA and the non-display area NDA. The display area DA may be disposed in a central portion of the display panel 100 and have an area greater than that of the non-display area NDA.

The display area DA may include a plurality of pixel areas, each of which is provided with one or more pixels PXL. The non-display area NDA is provided around the display area DA. According to some exemplary embodiments, the non-display area NDA may be formed on at least one side of the display area DA, or may be formed along a periphery of the display area DA. The non-display area NDA may be provided with one or more pad units (not illustrated) in which pads (not shown) of signal lines (not depicted) are provided, and a driver (e.g., data driver) DDV configured to provide data signals to the pixels PXL. The driver DDV may provide the data signals to the respective pixels PXL through data lines (not shown). The driver DDV may be disposed in a lateral portion of the non-display area NDA and extend a predetermined length in a transverse direction of the non-display area NDA; however, exemplary embodiments are not limited thereto.

Although not shown, the display device may include a scan driver, a light-emitting driver, and/or a timing controller. The scan driver, the light-emitting driver, and/or the timing controller may be provided in the non-display area NDA.

The substrate BS1 may be a flexible substrate, for example, a film substrate or and a plastic substrate including a polymeric organic material. For example, the flexible substrate may be made of a material selected from the group consisting of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP), but exemplary embodiments are not limited thereto. In some exemplary embodiments, the substrate BS1 may be a single layer structure or a multilayer structure including at least two layers made of at least one of the aforementioned materials.

In some exemplary embodiments, the substrate BS1 may be a rigid substrate. The rigid substrate may be one of a glass substrate, a quartz substrate, a glass ceramic substrate, and a crystalline glass substrate, but exemplary embodiments are not limited thereto.

The substrate BS1 may have a flat surface, and may be formed in a polygonal, circular, elliptical, etc., shape. However, the shape of the substrate BS1 is not limited thereto, and may be modified based on an application.

The substrate BS1 may include a plurality of signal lines (not shown) connected to the plurality of pixels PXL, and a plurality of thin-film transistors (not shown) connected to the plurality of signal lines.

Each of the plurality of pixels PXL may be an organic light-emitting element including an organic layer, but other types of elements may be used. For example, the pixel PXL may be embodied in various forms, such as a liquid crystal element, an electrophoretic element, an electrowetting element, etc. The plurality of pixels PXL may be provided in the display area DA of the substrate SUB, and each pixel PXL may be provided as a minimum unit for displaying an image. The pixel PXL may include an organic light-emitting element which emits white light and/or color light. Each pixel PXL may emit any one color of red, green, blue, and white, or any other suitable color. For example, the pixel PXL may emit a color, such as cyan, magenta, or yellow. Each pixel PXL may include a thin-film transistor (not shown) connected to a line unit (not shown), and an organic light-emitting element connected to the thin-film transistor (not shown).

The touch sensor 200 may be provided on a surface of the display panel 100 on which an image is displayed or otherwise conveyed to a user. Alternatively, the touch sensor 200 may be integrally formed with the display panel 100. As seen in FIG. 1, the touch sensor 200 is provided on a top surface of the display panel 100.

The touch sensor 200 may include a base substrate (or base layer) BS including the sensing area SA and the peripheral area PA. The base substrate BS may be formed of a flexible material or a rigid material. The base substrate BS may be provided in a substantially identical shape corresponding to the shape of the substrate BS1. The base substrate BS may have the same area as the substrate BS1 or may have a greater area than the substrate BS1; however, exemplary embodiments are not limited thereto.

The sensing area SA may correspond to the display area DA of the display panel 100. The peripheral area PA may be disposed adjacent to the sensing area SA. The peripheral area PA may correspond to the non-display area NDA of the display panel 100.

The touch sensor 200 may include sensing electrodes SE provided in the sensing area SA, sensing lines SL disposed in the peripheral area PA and respectively connected to the sensing electrodes SE, and one or more pad units TP connected to the sensing lines SL.

The sensing lines SL may be used to connect, for instance, the driver DDV (or any other suitable driving unit), which drives the sensing electrodes SE, to the sensing electrodes SE. The sensing lines SL may be provided in the peripheral region PA. The sensing lines SL may transmit a sensing input signal from the driver DDV to first sensing electrodes SE1 and/or second sensing electrodes SE2, or may transmit a sensing output signal from the first sensing electrodes SE1 and/or the second sensing electrodes SE2 to the driver DDV.

The sensing lines SL may be connected to the sensing electrodes SE. In a plan view, the sensing lines SL may be bent one or more times (e.g., several times) in the peripheral area PA.

The pad unit TP may be provided to transmit a signal between the sensing electrodes SE and the driver DDV. The pad unit TP may be provided in the peripheral area PA and connected to ends of the sensing lines SL. As seen in FIG. 3, the pad unit TP is shown to be separated into sub-units; however, exemplary embodiments are not limited thereto. For instance, the pad unit TP may be embodied as one pad unit in the peripheral area PA.

FIG. 4 is an enlarged plan view of portion E1 of FIG. 3 according to some exemplary embodiments. FIG. 5 is a cross-sectional view of the touch sensor of FIG. 3 taken along sectional line I-I' shown in FIG. 4 according to some exemplary embodiments.

Referring to FIGS. 4 and 5, the sensing lines SL may include a plurality of first sensing lines SL_1 and a plurality of second sensing lines SL1_2 disposed in an alternating fashion with the plurality of first sensing lines SL_1.

Referring to FIG. 5, each of the first sensing lines SL_1 and the second sensing lines SL1_2 may be provided as a first metal layer MTL1 on the base substrate BS.

The first metal layer MTL1 may be made of a conductive material. The conductive material may include at least one of a metal, an alloy thereof, a conductive polymer, a conductive metal oxide, a nano-conductive material, and/or the like. In some exemplary embodiments, the metal may be selected from the group consisting of copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, and the like. The conductive polymer may include at least one of a polythiophene type compound, a polypyrrole type compound, a polyaniline type compound, a polyacetylene type compound, a polyphenylene type compound, and/or a mixture thereof. For instance, among polythiophene type compounds, a poly(3,4-ethylenedioxythiophene) poly(styrenesulfonate) (PEDOT/PSS) compound may be used. The conductive metal oxide may include at least one of indium tin oxide (ITO), indium zinc oxide (IZO), antimony zinc oxide (AZO), indium tin zinc oxide (ITZO), zinc oxide (ZnO), and tin oxide ($SnO_2$), and the like. The nano-conductive compound may include at least one of silver nanowires (AgNW), carbon nano tubes, graphene, and the like.

A first insulating layer IL1 may be provided on the first metal layer MTL1. The first insulating layer IL1 may be an inorganic insulating layer made of an inorganic material or an organic insulating layer made of an organic material. The inorganic material may be an inorganic insulating material, such as at least one of polysiloxane, silicon nitride, silicon oxide, and silicon oxynitride, and/or the like. The organic material may be an organic insulating material, such as at least one of a polyacrylic compound, a polyimide compound, a fluorocarbon compound (such as Teflon), a benzocyclobutene compound, and/or the like.

The first insulating layer IL1 may include a contact hole CH that exposes at least a portion of the first metal layer MTL1.

A second metal layer MTL2 may be provided on the first insulating layer IL1. The second metal layer MTL2 may be made of an identical material to the first metal layer MTL1; however, exemplary embodiments are not limited thereto. The first metal layer MTL1 and the second metal layer MTL2 may be connected through the contact hole CH. For the sake of convenience, each of the sensing lines SL_1 and SL1_2 is illustrated to include the first contact hole CH, but exemplary embodiments are not limited thereto. For example, a plurality of contact holes CH may be provided in a corresponding one of the sensing lines SL_1 and SL1_2.

A second insulating layer IL2 may be provided on the second metal layer MTL2 and the first insulating layer IL1. The second insulating layer IL2 may be an inorganic insulating layer made of an inorganic material or an organic insulating layer made of an organic material.

A width d11 of the first metal layer MTL1 of the first sensing lines SL_1 may be different from a width d13 of the first metal layer MTL1 of the second sensing lines SL1_2. A width d12 of the second metal layer MTL2 of the first sensing line SL_1 may be different from a width d14 of the second metal layer MTL2 of the second sensing line SL1_2. In some exemplary embodiments, the width d11 of the first metal layer MTL1 of the first sensing line SL_1 is smaller than the width d13 of the first metal layer MTL1 of the second sensing line SL1_2, and the width d12 of the second metal layer MTL2 of the first sensing line SL_1 may be greater than the width d14 of the second metal layer MTL2 of the second sensing line SL1_2.

The metal layers having a larger width may have the same width. For example, the width d12 of the second metal layer MTL2 of the first sensing line SL_1 may be equal to the width d13 of the first metal layer MTL1 of the second sensing line SL1_2. In some exemplary embodiments, the width d11 of the first metal layer MTL1 of the first sensing line SL1_1 may be equal to the width d14 of the second metal layer MTL2 of the second sensing line SL1_2. Exemplary embodiments, however, are not limited thereto.

As previously mentioned, the relationship between the widths of the respective metal layers is not limited to as previously described. For example, the width d11 of the first metal layer MTL1 of the first sensing line SL_1 may be greater than the width d13 of the first metal layer MTL1 of the second sensing line SL1_2, and the width d12 of the second metal layer MTL2 of the first sensing line SL1_1 may be smaller than the width d14 of the second metal layer MTL2 of the second sensing line SL1_2.

Among the metal layers, metal layers having a smaller width, the width d1 of the first metal layer of the first sensing line SL_1 may be equal to the width d14 of the second metal layer MTL2 of the second sensing line SL1_2. In this case, the width d12 of the second metal layer MTL2 of the first sensing line SL_1 may be equal to the width d13 of the first metal layer MTL1 of the second sensing line SL1_2. However, exemplary embodiments are not limited thereto.

The widths of the first and second metal layers MTL1 and MTL2 of the first and second sensing lines SL_1 and SL1_2 may be adjusted within a range that does not significantly change the cross-sectional area values of the first and second sensing lines SL_1 and SL1_2 as would be recognized by one of ordinary skill in the art.

As the size of the peripheral area PA of the touch sensor 200 is reduced, the distance between the sensing lines SL may be reduced, thereby increasing the possibility that the sensing lines SL are short-circuited. To reduce such a possibility, according to some exemplary embodiments, the widths of the first and second metal layers MTL1 and MTL2 of the first and second sensing lines SL_1 and SL1_2 may be adjusted within a range that does not significantly change the cross-sectional area values of the sensing lines SL_1 and SL1_2. In this manner, a sufficient distance between the first metal layers MTL1 and the second metal layers MTL2 of the first and second sensing lines SL_1 and SL1_2 may be ensured, and it is possible to prevent a short circuit between the first and second sensing lines SL_1 and SL1_2.

The sensing electrodes SE may recognize a touch event of the finger of the user or a separate touch input device on the display device. In some exemplary embodiments, the sensing electrodes SE may be operated by a mutual capacitance method in which a change in capacitance by interaction between adjacent sensing and driving electrodes is sensed. In addition (or alternatively), the sensing electrodes SE may be operated by a self-capacitance method. The self-capacitance method is conducted using sensing electrodes SE arranged in a matrix form and sensing lines SL connected to the respective sensing electrodes SE, and sensing a change in capacitance of a sensing electrode SE of a touched area when a touch of the user is generated. It is contemplated, however, that any other suitable sensing method may be utilized in association with exemplary embodiments.

The sensing electrodes SE may include a plurality of the first sensing electrodes SE1 extending in the first direction DR1 of the base substrate BS and applied with a sensing voltage, and a plurality of the second sensing electrodes SE2 extending in the second direction DR2 intersecting with the first direction DR1. The first sensing electrodes SE1 may be electrostatically coupled to the second sensing electrodes SE2, and a voltage may be changed by the electrostatic coupling.

Figure 6A:
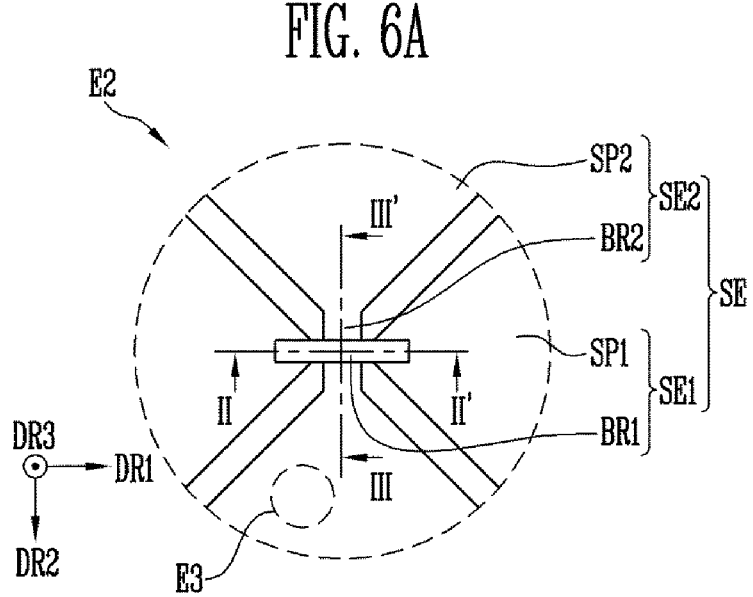
FIG. 6A is an enlarged plan view of portion E2 of FIG. 3 according to some exemplary embodiments.
Figure 6B:
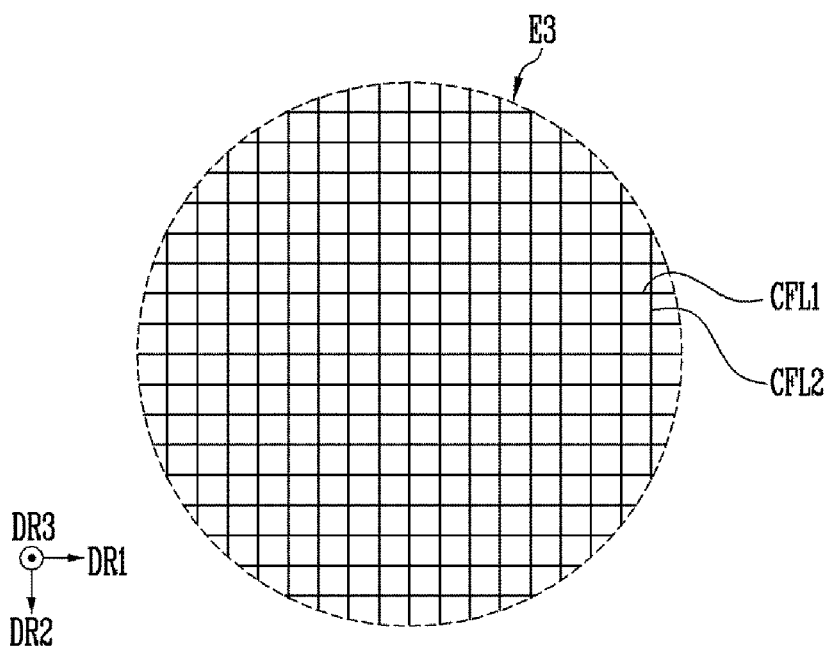
FIG. 6B is an enlarged plan view of portion E3 of FIG. 6A according to some exemplary embodiments.
Figure 7:
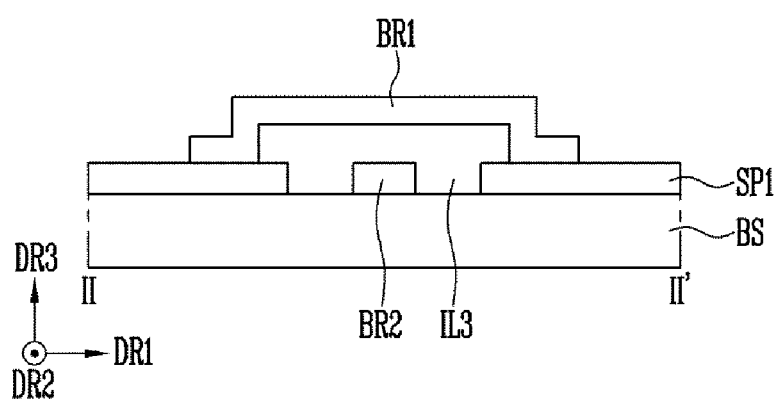
FIG. 7 is a cross-sectional view of the touch sensor of FIG. 3 taken along sectional line II-II' in FIG. 6A according to some exemplary embodiments.
Figure 8:
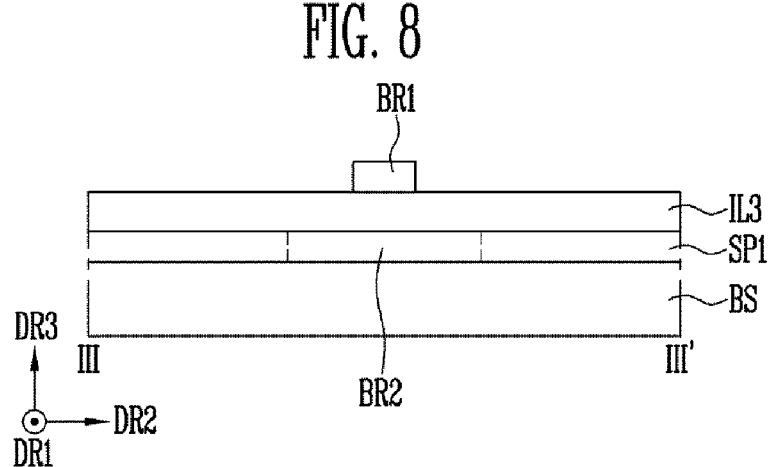
FIG. 8 is a cross-sectional view of the touch sensor of FIG. 3 taken along sectional line III-III' in FIG. 6A according to some exemplary embodiments.

FIG. 6A is an enlarged plan view of portion E2 of FIG. 3 according to some exemplary embodiments. FIG. 6B is an enlarged plan view of portion E3 of FIG. 6A according to some exemplary embodiments. FIG. 7 is a cross-sectional view of the touch sensor of FIG. 3 taken along sectional line II-II' in FIG. 6A according to some exemplary embodiments. FIG. 8 is a cross-sectional view of the touch sensor of FIG. 3 taken along sectional line III-III' in FIG. 6A according to some exemplary embodiments.

Each of the first sensing electrodes SE1 may include a plurality of first sensing patterns SP1 arranged in the first direction DR1 and a plurality of first bridges BR1 connecting the first sensing patterns SP1 adjacent to each other. The first sensing patterns SP1 may be provided in various shapes, such as a polygonal shape including square shapes, e.g., rods, rhombuses, or the like. The first sensing patterns SP1 and the first bridges BR1 may be provided in the form of a plate shape or a mesh shape composed of fine lines.

Each of the second sensing electrodes SE2 may include a plurality of second sensing patterns SP2 arranged in the second direction DR2 and a plurality of second bridges BR2 connecting the second sensing patterns SP2 adjacent to each other. The second sensing patterns SP2 may also be provided in various shapes, such as polygonal shape including square shapes, e.g., rods, rhombuses, or the like. The second sensing patterns SP2 and the second bridges BR2 may be provided in the form of a plate shape or a mesh shape composed of fine lines.

The second sensing patterns SP2 are provided in a mesh form, they may include a plurality of conductive lines CFL1 and CFL2, as shown is FIG. 6B. For example, the second sensing patterns SP2 may include a plurality of first conductive fine lines CFL1 extending in the first direction DR1 and parallel to each other, and a plurality of second conductive fine lines CF2 extending in the second direction DR2 and parallel to each other. The first conductive fine lines CFL1 and the second conductive fine lines CFL2 may form the mesh shape. The mesh shape may include a plurality of openings, for example, regions formed by the crossing of the first conductive fine lines CFL1 and the second conductive fine lines CFL2. Each of the second sensing patterns SP2 has the mesh shape in the drawing, but the present embodiment is not limited thereto. For example, each of the first sensing patterns SP1, the first bridges BR1, and the second bridges BR2 may include the plurality of conductive fin lines. At least one the first and second conductive lines CFL1 and CFL2 may have the same structure and material as the first and second metal layers MTL1 and MTL2 of the sensing lines SL, respectively. When the first sensing patterns SP1 and the second sensing patterns SP2 have the mesh shape, an area in which the first sensing patterns SP1 and the second sensing patterns SP2 overlap the display panel 100 may be reduced due to the openings. When the area in which the first sensing patterns SP1 and the second sensing patterns SP2 overlap the display panel 100 is reduced, an electromagnetic interference between the first sensing patterns SP1 and the second sensing patterns SP2 and the display panel 100 may be prevented. Accordingly, the touch sensitivity of the touch sensor 200 may be improved.

The first sensing patterns SP1 and the second sensing patterns SP2 may be alternately arranged in a matrix form on the base substrate BS.

The first sensing patterns SP1 and the second sensing patterns SP2 may be insulated from each other. In FIGS. 3 and 6, the first bridges BR1 and the second bridges BR2 have been illustrated as intersecting with each other, but actually the first and second bridges BR1 and BR2 are insulated from each other by a third insulating layer IL3 interposed therebetween, as seen in FIGS. 7 and 8. The first sensing electrodes SE1 and the second sensing electrodes SE2 may be provided on different layers. In some exemplary embodiments, the first sensing patterns SP1 and the second sensing patterns SP2 may be provided on the same layer, and the first bridges BR1 and the second bridges BR2 may be provided on different layers. One of the first bridges BR1 and the second bridges BR2 may be provided on the same layer as the first metal layer MTL1 and may include the same material as the first metal layer MTL1. The other of the first bridges BR1 and the second bridges BR2 may be provided on the same layer as the second metal layer MTL2 and may include the same material as the second metal layer MTL2.

Figure 9:
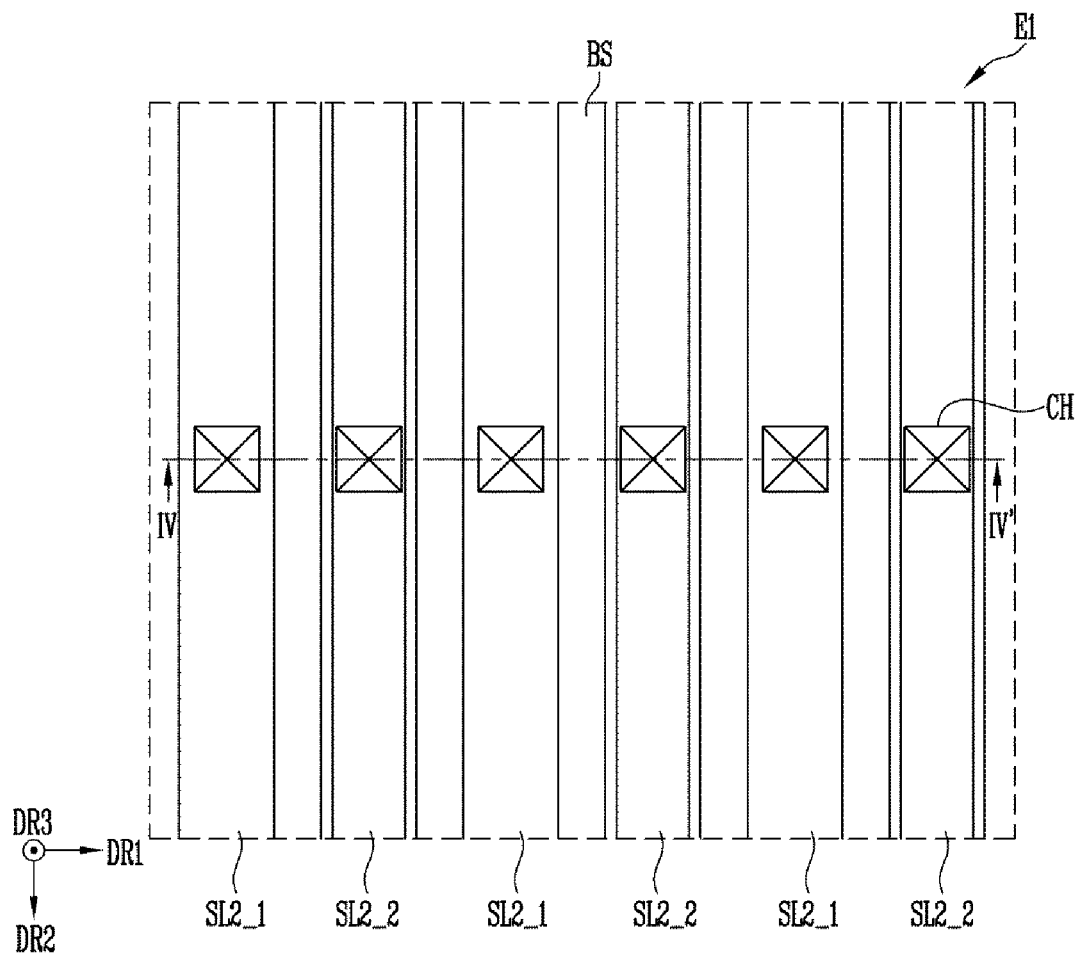
FIG. 9 is an enlarged plan view of portion E1 of FIG. 3 according to some exemplary embodiments.
Figure 10:
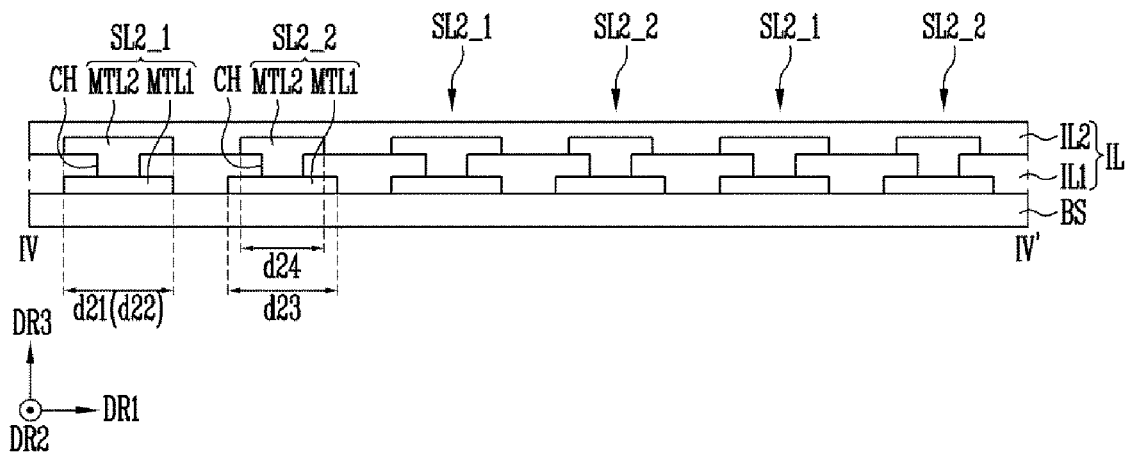
FIG. 10 is a cross-sectional view of the touch sensor of FIG. 3 taken along sectional line IV-IV' in FIG. 9 according to some exemplary embodiments.

FIG. 9 is an enlarged plan view of portion E1 of FIG. 3 according to some exemplary embodiments. FIG. 10 is a cross-sectional view of the touch sensor of FIG. 3 taken along sectional line IV-IV' in FIG. 9 according to some exemplary embodiments.

Referring to FIGS. 9 and 10, the sensing lines SL may include a plurality of first sensing lines SL2_1 and a plurality of second sensing lines SL2_2 disposed in an alternating fashion with the plurality of first sensing lines SL2_1. It is noted that the configuration of the first sensing lines SL2_1 and the second sensing lines SL2_2 may be similar to the configurations of the first sensing lines SL_1 and the second sensing lines SL1_2, and, therefore, exemplary embodiments of FIGS. 9 and 10 will be mainly described with respect to the differences from previous exemplary embodiments, and the omitted descriptions can be understood based on the preceding descriptions.

A width d21 of the first metal layer MTL1 of the first sensing lines SL2_1 may be equal to a width d23 of the first metal layer MTL1 of the second sensing lines SL2_2. A width d22 of the second metal layer MTL2 of the first sensing lines SL2_1 may be different from a width d24 of the second metal layer MTL2 of the second sensing lines SL2_2. Further, one of the width d22 of the second metal layer MTL2 of the first sensing lines SL2_1 and the width d24 of the second metal layer MTL2 of the second sensing lines SL2_2 may be equal to the width d21 and d23 of the first metal layer MTL1. For instance, as seen in FIGS. 9 and 10, the width d21 of the first metal layer MTL1 of the first sensing lines SL2_1, the width d22 of the second metal layer MTL2 of the first sensing lines SL2_1, and the width d23 of the first metal layer MTL1 of the second sensing lines SL2_2 may be equal to one another and different from the width d24 of the second metal layer MTL2 of the second sensing lines SL2_2.

Figure 11:
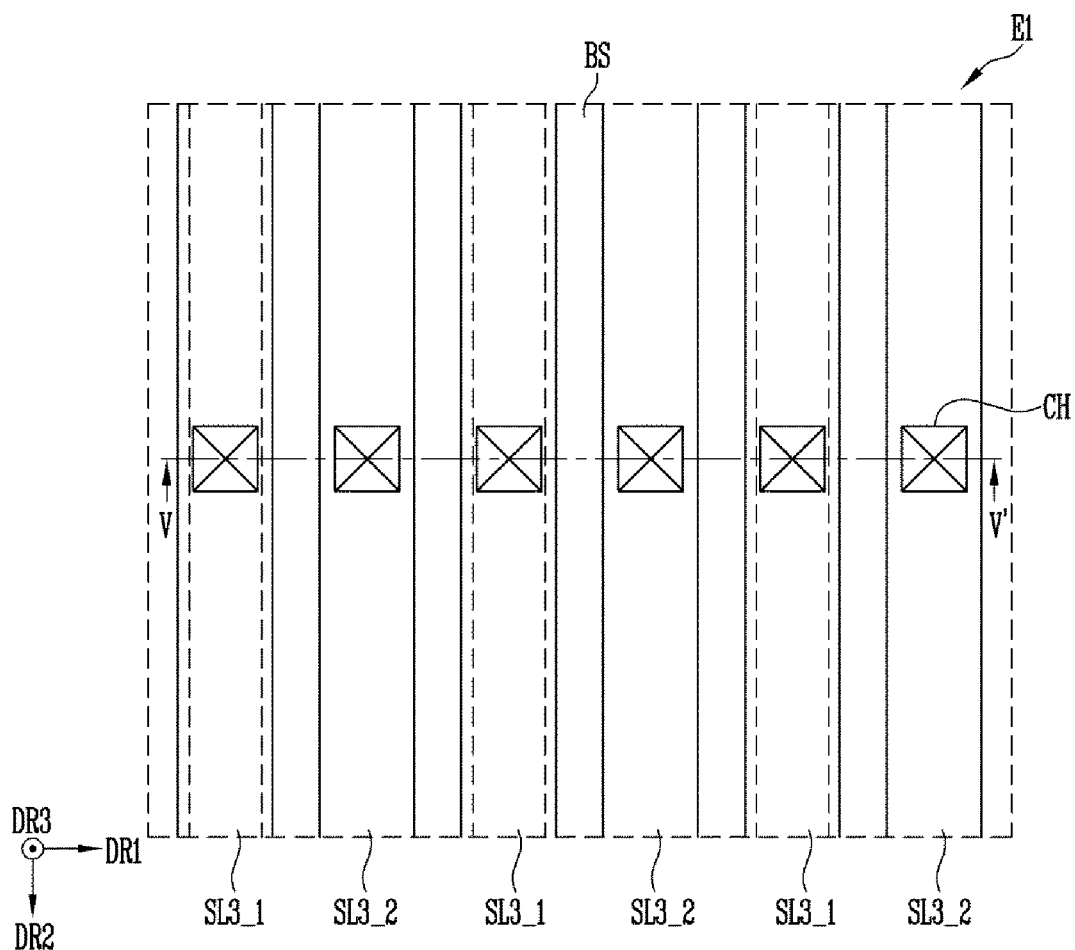
FIG. 11 is an enlarged plan view of portion E1 of FIG. 3 according to some exemplary embodiments.
Figure 12:
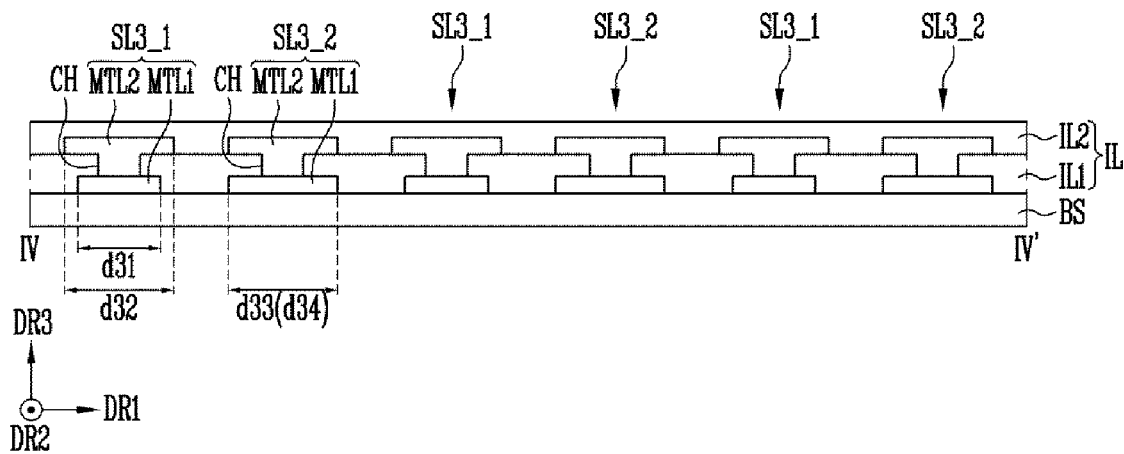
FIG. 12 is a cross-sectional view of the touch sensor of FIG. 3 taken along sectional line V-V' in FIG. 11 according to some exemplary embodiments.

FIG. 11 is an enlarged plan view of portion E1 of FIG. 3 according to some exemplary embodiments. FIG. 12 is a cross-sectional view of the touch sensor of FIG. 3 taken along sectional line V-V' in FIG. 11 according to some exemplary embodiments.

Referring to FIGS. 11 and 12, the sensing lines SL may include a plurality of first sensing lines SL3_1 and a plurality of second sensing lines SL3_2 disposed in an alternating fashion with the plurality of first sensing lines SL3_1. It is noted that the configuration of the first sensing lines SL3_1 and the second sensing lines SL3_2 may be similar to the configurations of the first sensing lines SL_1 and the second sensing lines SL1_2, and, therefore, exemplary embodiments of FIGS. 11 and 12 will be mainly described with respect to the differences from previous exemplary embodiments, and the omitted descriptions can be understood based on the preceding descriptions.

A width d31 of the first metal layer MTL1 of the first sensing lines SL3_1 may be different from a width d33 of the first metal layer MTL1 of the second sensing lines SL3_2. A width d32 of the second metal layer MTL2 of the first sensing lines SL3_1 may be equal to a width d34 of the second metal layer MTL2 of the second sensing lines SL3_2. Further, one of the width d31 of the first metal layer MTL1 of the first sensing lines SL3_1 and the width d33 of the first metal layer MTL1 of the second sensing lines SL3_2 may be equal to the width d32 and d34 of the second metal layer MTL2. For instance, as seen in FIGS. 11 and 12, the width d23 of the second metal layer MTL2 of the first sensing lines SL3_1, the width d33 of the first metal layer MTL1 of the second sensing lines SL3_2, and the width d34 of the second metal layer MTL2 of the second sensing lines SL3_2 may be equal to one another and different from the width d31 of the first metal layer MTL1 of the first sensing lines SL3_1.

Figure 13:
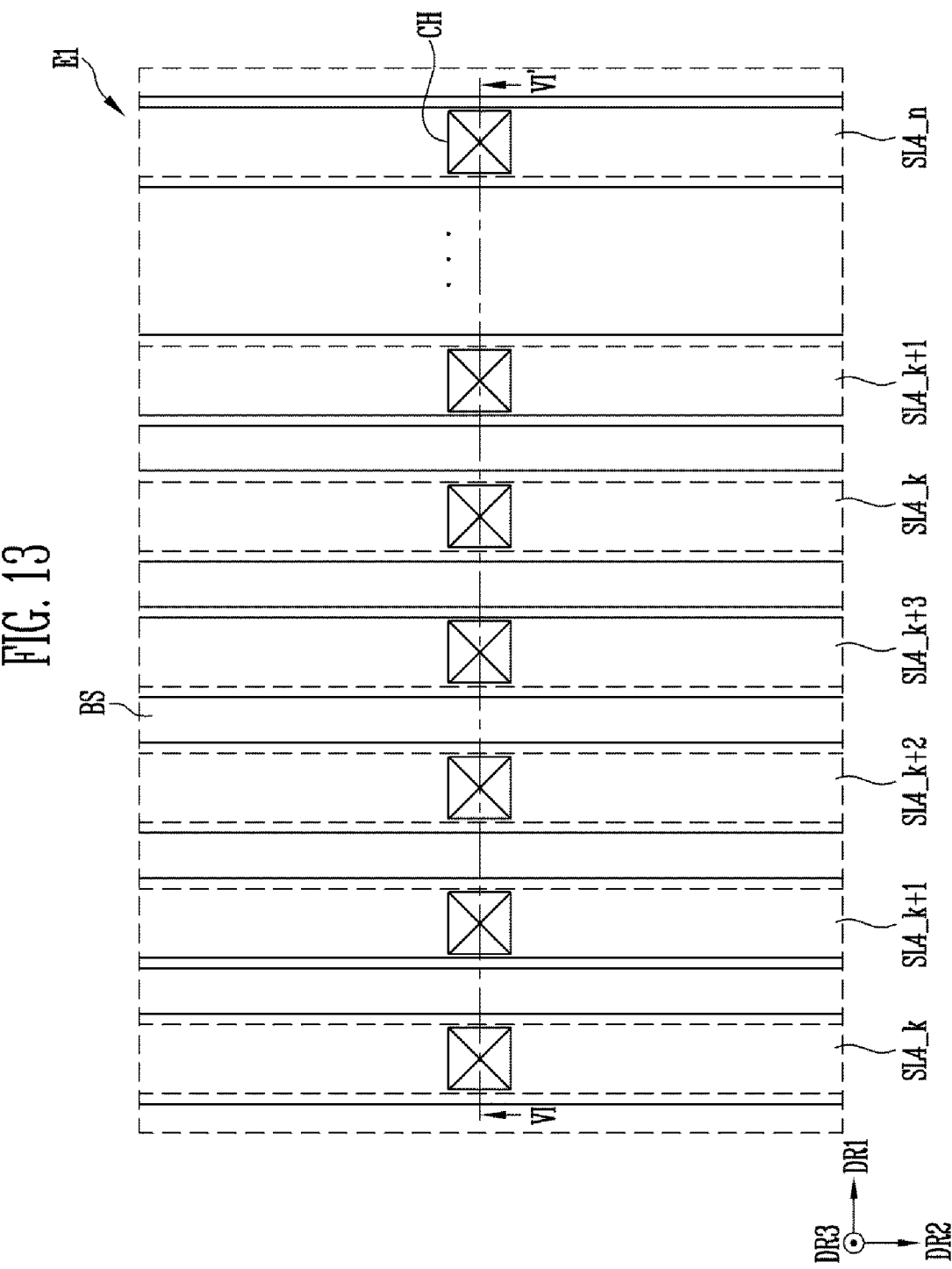
FIG. 13 is an enlarged plan view of portion E1 of FIG. 3 according to some exemplary embodiments.

FIG. 13 is an enlarged plan view of portion E1 of FIG. 3 according to some exemplary embodiments. FIG. 14 is a cross-sectional view of the touch sensor of FIG. 3 taken along sectional line VI-VI' in FIG. 13 according to some exemplary embodiments.

Referring to FIGS. 13 and 14, the sensing lines SL may include n sensing lines (where "n" is a natural number). It is noted that the configuration of the n sensing lines may be similar to the configurations of the first sensing lines SL_1 and the second sensing lines SL1_2, and, therefore, exemplary embodiments of FIGS. 13 and 14 will be mainly described with respect to the differences from previous exemplary embodiments, and the omitted descriptions can be understood based on the preceding descriptions.

The n sensing lines may include iterations of 1 sensing lines as a single unit (where "1" is a natural number of 2 or more and "n" or less). There is no limitation on the numbers of n and 1. In FIGS. 13 and 14, it is assumed that 1 is four (4) for the sake of convenience, but exemplary embodiments are not limited thereto. Among the 1 sensing lines as one unit, if a $k^{th}$ sensing line is referred to as SL4_$k$ (where "k"

is a natural number equal to or less than (1-1)), a (k+1)$^{th}$ sensing line adjacent thereto may be referred to as SL4_k+1.

A width d41 of the first metal layer MTL1 of the k$^{th}$ sensing line SL4_k may be different from a width d44 of the first metal layer MTL1 of the (k+1)$^{th}$ sensing line SL4_k+1. A width d42 of the second metal layer MTL2 of the k$^{th}$ sensing line SL4_k may be different from a width d45 of the second metal layer MTL2 of the (k+1)$^{th}$ sensing line SL4_k+1. Further, a distance d47 between the first metal layer MTL1 of the k$^{th}$ sensing line SL4_k and the first metal layer MTL1 of the (k+1)$^{th}$ sensing line SL4_k+1 may be equal to a distance d48 between the second metal layer MTL2 of the k$^{th}$ sensing line SL4_k and the second metal layer MTL2 of the (k+1)$^{th}$ sensing line SL4_k+1. It is noted, however, that distances d47 and d48 may be offset from one another in the first direction DR1, as will become more apparent below.

A width d43 of an overlapping region of the first metal layer MTL1 and the second metal layer MTL2 of the k$^{th}$ sensing line SL4_k may be equal to a width d46 of an overlapping region of the first metal layer MTL1 and the second metal layer MTL2 of the (k+1)$^{th}$ sensing line SL4_k+1. In addition, a sum of the width d41 of the first metal layer MTL1 and the width d42 of the second metal layer MTL2 of the k$^{th}$ sensing line SL4_k may be equal to a sum of the width d44 of the first metal layer MTL1 and the width d45 of the second metal layer MTL2 of the (k+1)$^{th}$ sensing line SL4_k+1. As such, an offset between the distances d47 and d48 in the first direction DR1 may be equal to half a difference between the width d42 of the second metal layer MTL2 of the k$^{th}$ sensing line SL4_k and the width d41 of the first metal layer MTL1 of the k$^{th}$ sensing line SL4_k.

As seen in FIG. 14, first iterations of the n sensing lines may have mirror symmetry with respect to an imaginary line extending in the first direction DR1. For instance, the k$^{th}$ sensing line SL4_k may have mirror symmetry with the (k+2)$^{th}$ sensing line SL4_k+2 with respect to an imaginary line extending in the first direction DR1, the imaginary line bisecting the k$^{th}$ sensing line SL4_k and the (k+2)$^{th}$ sensing line SL4_k+2. Further, second iterations of the n sensing lines may have mirror symmetry with respect to imaginary lines extending in the third direction DR3 between adjacent ones of the n sensing lines grouped in the second iterations. For instance, the (k+1)$^{th}$ sensing line SL4_k+1 may have mirror symmetry with the (k+3)$^{th}$ sensing line SL4_k+3 with respect to an imaginary line extending in the third direction DR3 between the (k+1)$^{th}$ sensing line SL4_k+1 and the (k+3)$^{th}$ sensing line SL4_k+3.

According to various exemplary embodiments, a touch sensor may be configured to prevent a short circuit between sensing lines by adjusting the width of the sensing lines and securing a distance between the sensing lines without reducing the resistance of the sensing lines.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A touch sensor, comprising:
    a substrate comprising:
        a sensing area; and
        a peripheral area outside the sensing area;
    sensing electrodes overlapping the sensing area; and
    sensing lines overlapping the peripheral area and respectively connected to the sensing electrodes, the sensing lines comprising first sensing lines alternatingly arranged with second sensing lines,
    wherein each of the first sensing lines and the second sensing lines comprises:
        a first metal layer on the substrate;
        a first insulating layer on the first metal layer, the first insulating layer comprising a first contact hole exposing a portion of the first metal layer; and
        a second metal layer on the first insulating layer, the second metal layer being connected to the first metal layer through the first contact hole,
    wherein a width of the first metal layer of each first sensing line of the first sensing lines is different from a width of the first metal layer of each second sensing line of the second sensing lines, and
    wherein a width of the second metal layer of each first sensing line of the first sensing lines is different from a width of the second metal layer of each second sensing line of the second sensing lines.

2. The touch sensor of claim 1, wherein:
    the width of the first metal layer of each first sensing line of the first sensing lines is smaller than the width of the first metal layer of each second sensing line of the second sensing lines; and
    the width of the second metal layer of each first sensing line of the first sensing lines is greater than the width of the second metal layer of each second sensing line of the second sensing lines.

3. The touch sensor of claim 2, wherein the width of the second metal layer of each first sensing line of the first sensing lines is equal to the width of the first metal layer of each second sensing line of the second sensing lines.

4. The touch sensor of claim 2, wherein a sum of the width of the second metal layer of each first sensing line of the first sensing lines and the width of the second metal layer of each second sensing line of the second sensing lines is equal to a sum of the width of the first metal layer of each first sensing line of the first sensing lines and the width of the first metal layer of each second sensing line of the second sensing lines.

5. The touch sensor of claim 1, wherein:
    the width of the first metal layer of each first sensing line of the first sensing lines is greater than the width of the first metal layer of each second sensing line of the second sensing lines; and
    the width of the second metal layer of each first sensing line of the first sensing lines is smaller than the width of the second metal layer of each second sensing line of the second sensing lines.

6. The touch sensor of claim 5, wherein the width of the first metal layer of each first sensing line of the first sensing lines is equal to the width of the second metal layer of each second sensing line of the second sensing lines.

7. The touch sensor of claim 5, wherein a sum of the width of the second metal layer of each first sensing line of the sensing lines and the width of the second metal layer of each second sensing line of the second sensing lines is equal to a sum of the width of the first metal layer of each first sensing line of the first sensing lines and the width of the first metal layer of each second sensing line of the second sensing lines.

8. The touch sensor of claim 1, wherein each of the sensing electrodes comprising:
    a plurality of first conductive lines extending along a first direction; and
    a plurality of second conductive lines extending along a second direction crossing the first direction.

9. A touch sensor, comprising:
a substrate comprising:
   a sensing area; and
   a peripheral area outside the sensing area;
sensing electrodes overlapping the sensing area; and
sensing lines overlapping the peripheral area and respectively connected to the sensing electrodes, the sensing lines comprising first sensing lines alternatingly arranged with second sensing lines,
wherein each of the first sensing lines and the second sensing lines comprises:
   a first metal layer on the substrate;
   a first insulating layer on the first metal layer, the first insulating layer comprising a first contact hole exposing a portion of the first metal layer; and
   a second metal layer on the first insulating layer, the second metal layer being connected to the first metal layer through the first contact hole, and
wherein:
   a width of the first metal layer of each first sensing line of the first sensing lines is equal to a width of the first metal layer of each second sensing line of the second sensing lines, and a width of the second metal layer of each first sensing line of the first sensing lines is different from a width of the second metal layer of each second sensing line of the second sensing lines; or
   a width of the second metal layer of each first sensing line of the first sensing lines is equal to a width of the second metal layer of each second sensing line of the second sensing lines, and a width of the first metal layer of each first sensing line of the first sensing lines is different from a width of the first metal layer of each second sensing line of the second sensing lines.

10. The touch sensor of claim 9, wherein:
a common width of the first metal layers of each first sensing line of the first sensing lines and each second sensing line of the second sensing lines is equal to a greater value among the width of the second metal layers of each first sensing line of the first sensing lines and each second sensing line of the second sensing lines; or
a common width of the second metal layers of each first sensing line of the first sensing lines and each second sensing line of the second sensing lines is equal to a greater value among the width of the first metal layers of each first sensing line of the first sensing lines and each second sensing line of the second sensing lines.

11. The touch sensor of claim 9, wherein each of the sensing electrodes comprising:
a plurality of first conductive lines extending along a first direction; and
a plurality of second conductive liens extending along a second direction crossing the first direction.

12. A touch sensor, comprising:
a substrate comprising:
   a sensing area; and
   a peripheral area outside the sensing area;
sensing electrodes overlapping the sensing area; and
n sensing lines overlapping the peripheral area and respectively connected to the sensing electrodes, n being a natural number,
wherein each of the n sensing lines comprises:
   a first metal layer on the substrate;
   a first insulating layer on the first metal layer, the first insulating layer comprising a first contact hole exposing a portion of the first metal layer; and
   a second metal layer on the first insulating layer, the second metal layer being connected to the first metal layer through the first contact hole,
wherein the n sensing lines comprises iterations of I sensing lines as a unit, I being a natural number greater than or equal to two and less than or equal to n,
wherein, in the unit, a width of the first metal layer of a $k^{th}$ sensing line is different from a width of the first metal layer of a $(k+1)^{th}$ sensing line adjacent to the $k^{th}$ sensing line, k being a natural number less than or equal to I−1,
wherein, in the unit, a width of the second metal layer of the $k^{th}$ sensing line is different from a width of the second metal layer of the $(k+1)^{th}$ sensing line, and
wherein a distance between the first metal layer of the $k^{th}$ sensing line and the first metal layer of the $(k+1)^{th}$ sensing line is equal to a distance between the second metal layer of the $k^{th}$ sensing line and the second metal layer of the $(k+1)^{th}$ sensing line.

13. The touch sensor of claim 12, wherein a width of an overlapping region of the first metal layer of the $k^{th}$ sensing line and the second metal layer of the $k^{th}$ sensing line is equal to a width of an overlapping region of the first metal layer of the $(k+1)^{th}$ sensing line and the second metal layer of the $(k+1)^{th}$ sensing line.

14. The touch sensor of claim 12, wherein a sum of the width of the first metal layer of the $k^{th}$ sensing line and the width of the second metal layer of the $k^{th}$ sensing line is equal to a sum of the width of the first metal layer of the $(k+1)^{th}$ sensing line and the width of the second metal layer of the $(k+1)^{th}$ sensing line.

15. The touch sensor of claim 12, wherein each of the sensing electrodes comprising:
a plurality of first conductive lines extending along a first direction; and
a plurality of second conductive lines extending along a second direction crossing the first direction.

16. The touch sensor of claim 12, wherein:
the n sensing lines are adjacent to one another in a first direction; and
a layer structure of the $k^{th}$ sensing line has mirror symmetry with a layer structure of a $(k+2)^{th}$ sensing line with respect to an imaginary line extending in the first direction, the imaginary line bisecting the $k^{th}$ sensing line and the $(k+2)^{th}$ sensing line.

17. The touch sensor of claim 16, wherein a layer structure of the $(k+1)^{th}$ sensing line has mirror symmetry with a layer structure of a $(k+3)^{th}$ sensing line with respect to an imaginary line extending in a second direction perpendicular to the first direction.

18. The touch sensor of claim 17, wherein:
a width of the second metal layer of the $(k+1)^{th}$ sensing line is equal to a width of the second metal layer of the $(k+3)^{th}$ sensing line; and
a width of the second metal layer of the $(k+2)^{th}$ sensing line is smaller than the width of the second metal layer of the $(k+1)^{th}$ sensing line.

19. The touch sensor of claim 17, wherein:
a width of the second metal layer of the $(k+1)^{th}$ sensing line is equal to a width of the second metal layer of the $(k+3)^{th}$ sensing line; and
a width of the second metal layer of the $(k+2)^{th}$ sensing line is greater than the width of the second metal layer of the $(k+1)^{th}$ sensing line.

20. The touch sensor of claim 12, wherein:
the n sensing lines are adjacent to one another in a first direction; and
a layer structure of the $(k+1)^{th}$ sensing line has mirror symmetry with a layer structure of a $(k+3)^{th}$ sensing line with respect to an imaginary line extending in a second direction perpendicular to the first direction.

* * * * *